United States Patent
Blot et al.

[11] Patent Number: 5,907,003
[45] Date of Patent: May 25, 1999

[54] ROAD PAINT COMPOSITIONS CONTAINING AN UNSATURATED POLYESTER RESIN

[75] Inventors: Estelle Blot, Lyons; Claude Stock, Soleymieu, both of France

[73] Assignee: Lafarge Materiaux De Specialites, France

[21] Appl. No.: 08/945,078

[22] PCT Filed: Apr. 22, 1997

[86] PCT No.: PCT/FR96/00610

§ 371 Date: Oct. 20, 1997

§ 102(e) Date: Oct. 20, 1997

[87] PCT Pub. No.: WO96/33241

PCT Pub. Date: Oct. 24, 1996

[51] Int. Cl.$^6$ .............. C09D 4/06; C09D 5/00; C08F 283/01; B01F 9/04
[52] U.S. Cl. .......... 523/522; 523/219; 523/523; 523/526; 523/527; 427/137
[58] Field of Search .................. 523/522, 523, 523/526, 527, 219

[56] References Cited

U.S. PATENT DOCUMENTS 4,666,978   5/1987   Storey et al. .............. 525/35

FOREIGN PATENT DOCUMENTS

| 160723 | 11/1985 | European Pat. Off. | ........ 523/522 |
| 1450935 | 11/1966 | France | ........ 523/522 |
| 94/21960 | 9/1994 | WIPO | ........ 523/522 |

OTHER PUBLICATIONS

Derwent Abstracts 94–068399, "Road Mark with Good Abrasion Resistance", Jun. 1992.

Derwent Abstracts 81–92157, "Resin Composition for Binding Mortar or Concrete", Nov. 1981.

Primary Examiner—Frederick Krass
Attorney, Agent, or Firm—Millen, White, Zelano, & Branigan, P.C.

[57] ABSTRACT

The invention concerns paint compositions for providing road markings, in particular on wet roadways. The paint compositions essentially comprise: at least one unsaturated polyester; at least one ethylenically unsaturated monomer; at least one polymerization accelerator selected from toluidine derivatives; at least one colored pigment; at least one compound which can exude at the surface of the paint and prevent oxygen in the air from inhibiting polymerization; glass beads and dibenzoyl peroxide.

26 Claims, No Drawings

ROAD PAINT COMPOSITIONS CONTAINING AN UNSATURATED POLYESTER RESIN

This application is a 371 of PCT/FR96/00610 filed Apr. 22, 1996.

The invention relates to paint compositions intended to be applied to a road, motorway or similar surface to produce road markings.

In view of the large amount of road traffic, road markings using marking of roads, motorways and the like are nowadays an indispensable instrument of road safety.

To be effective, however, road markings using marking of roads, motorways and the like must satisfy a number of criteria, the main ones of which are stated below:
- the visibility of the road marking to the car user which must be as good in daytime as at night;
- the durability of the road marking, which is directly related to its thickness and to its mechanical properties (resistance to wear and to impacts, adherence to the road surface and resistance to soiling);
- the slip resistance of the road marking because, otherwise, it would constitute a danger to the user.

Furthermore, the ease of processing of the road paint composition, the speed with which it can be applied and, above all, the delay in reopening the road to traffic after marking are also essential criteria for selection of the road paint composition.

At present the applications of road paint compositions are performed on dry surfaces, at ambient temperatures of between 5 and 40° C. This, of course, limits the period of application to between the months of March and October and the days of application to rain-free days.

Among the road paint compositions employed at present there are known those containing an unsaturated polyester resin as binder; these compositions are usually two-component and can be applied at ambient temperatures to a road surface without the use of heating of the paint itself and/or of the road surface.

The chief defect of these road paint compositions based on unsaturated polyester resin lies in the fact that they cannot be applied in rainy weather. In fact, when the roadway is wet, these road paint compositions cure slowly or not at all and, in addition, do not adhere properly to the roadway.

To overcome these problems it has been proposed in the past, for example in U.S. Pat. No. 3,743,686, to modify the unsaturated polyester resin by inserting a particular monomer into it.

More recently, in the international application published under Number WO94/21960 a single-component road paint composition has been proposed including an unsaturated polyester, a crosslinking agent, at least one pigment, a suspension agent, a wetting agent, fillers, one or more polymerization inhibitors, glass beads, a catalyst in the form of an aqueous dispersion of a dibenzoyl peroxide encapsulated in an ionic environment produced with specific chemical compounds, the catalyst thus treated being bound to the surface of the glass beads, one or more accelerators such as organic cobalt salts or dimethylaniline and, preferably, an agent stabilizing against ultraviolet (UV) rays.

However, as the Applicant Company has been able to ascertain through many experiments, the curing of the road paint compositions which contain an unsaturated polyester is highly perturbed (i.e. absence of polymerization or delay in polymerization by at least half an hour) in the presence of moisture when the catalysts/accelerators employed are chosen from the pairs:

dibenzoyl peroxide/cobalt salts or
methyl ethyl ketone peroxide/cobalt salts or
dibenzoyl peroxide/dimethylaniline.

This is why the present invention is intended to provide new road paint compositions, the said compositions satisfying the abovementioned various criteria, in particular a satisfactory cure time, even when they are applied to a wet roadway as a thin layer (i.e. of the order of 1000 microns or less, and more generally of the order of 250 microns).

By a satisfactory cure time the Applicant Company means a time shorter than or equal to 15 minutes between the application of the road paint compositions and the reopening of the road to traffic after marking.

Taken in its first aspect, the present invention therefore has as its subject-matter road paint compositions characterized in that they contain as essential constituents, after application:
a) at least one unsaturated polyester;
b) at least one ethylenically unsaturated monomer as diluent and as comonomer for radical polymerization of the unsaturated polyester;
c) at least one polymerization accelerator chosen from toluidine derivatives, preferably from para-toluidine derivatives, more preferably from diethanol-para-toluidine, diethoxy-para-toluidine, diethyl-para-toluidine or a mixture of the abovementioned para-toluidine derivatives;
d) at least one coloured pigment, preferably a white pigment;
e) at least one compound capable of being exuded at the surface of the paint and of preventing the inhibition of polymerization by the oxygen in air;
f) optionally at least one light-coloured inorganic filler, preferably white-coloured;
g) glass beads;
h) dibenzoyl peroxide as catalyst for the polymerization reaction of the unsaturated polyester with the ethylenically unsaturated monomer;
i) as well as, optionally, one or more compounds for distributing the catalyst over the surface of the glass beads.

Before application, the compositions according to the present invention may be presented in various forms, preferably as two or three components, kept separately, more preferably as two components kept separately.

The two-component compositions according to the present invention include two components kept separately, the two components being mixed in desired proportions just before the application of the paint, or applied successively to the roadway, the first component containing, as essential constituents:
a) at least one unsaturated polyester;
b) at least one ethylenically unsaturated monomer as diluent and as comonomer for radical polymerization of the unsaturated polyester;
c) at least one polymerization accelerator chosen from toluidine derivatives, preferably from para-toluidine derivatives, more preferably from diethanol-para-toluidine, diethoxy-para-toluidine, diethyl-para-toluidine or a mixture of the abovementioned para-toluidine derivatives;
d) at least one coloured pigment, preferably a white pigment;
e) at least one compound capable of being exuded at the surface of the paint and of preventing the inhibition of polymerization by the oxygen in air;

f) optionally, at least one light-coloured inorganic filler, preferably white-coloured;

and the second component containing, as essential constituents:

g) glass beads;
h) dibenzoyl peroxide as catalyst for the polymerization reaction of the unsaturated polyester with the ethylenically unsaturated monomer;
i) optionally one or more compounds for distributing the catalyst over the surface of the glass beads;
j) optionally at least one inorganic filler such as, for example, cristobalite.

As indicated above, the compositions according to the invention may consist of three components kept separately, it being possible for the three components to be mixed in desired proportions just before the application of the paint, or applied successively to the roadway. According to a first embodiment of the three-component compositions according to the invention, the first component contains as essential constituents:

a) at least one unsaturated polyester;
b) at least one ethylenically unsaturated monomer, as diluent and as comonomer for radical polymerization of the unsaturated polyester;
c) at least one polymerization accelerator chosen from toluidine derivatives, preferably from para-toluidine derivatives, more preferably from diethanol-para-toluidine, diethoxy-para-toluidine, diethyl-para-toluidine or a mixture of the abovementioned para-toluidine derivatives;
d) at least one coloured pigment, preferably a white pigment;
e) at least one compound capable of being exuded at the surface of the paint and of preventing the inhibition of polymerization by the oxygen in air;
f) optionally at least one light-coloured inorganic filler, preferably white-coloured;

the second component containing:

g) at least glass beads, treated or otherwise, and optionally various organic or inorganic compounds;

and the third component containing:

h) dibenzoyl peroxide as catalyst for the polymerization reaction of the unsaturated polyester with the ethylenically unsaturated monomer;
i) optionally various organic or inorganic compounds such as a diluent for dibenzoyl peroxide, such as dibutyl phthalate or an inorganic filler such as cristobalite.

According to a second embodiment of the three-component compositions according to the invention, the first component contains as essential constituents:

a) at least one unsaturated polyester;
b) at least one ethylenically unsaturated monomer, as diluent and as comonomer for radical polymerization of the unsaturated polyester;
c) at least one polymerization accelerator chosen from toluidine derivatives, preferably from para-toluidine derivatives, more preferably from diethanol-para-toluidine, diethoxy-para-toluidine, diethyl-para-toluidine or a mixture of the abovementioned para-toluidine derivatives;
d) at least one coloured pigment, preferably a white pigment;
e) at least one compound capable of being exuded at the surface of the paint and of preventing the inhibition of polymerization by the oxygen in air;
f) optionally at least one light-coloured inorganic filler, preferably white-coloured.

The second component contains:

a) at least one unsaturated polyester;
b) at least one ethylenically unsaturated monomer, as diluent and as comonomer for radical polymerization of the unsaturated polyester;
c) dibenzoyl peroxide as catalyst for the polymerization reaction of the unsaturated polyester with the ethylenically unsaturated monomer;
d) at least one coloured pigment preferably a white pigment;
e) at least one compound capable of being exuded at the surface of the paint and of preventing the inhibition of polymerization by the oxygen in air;
f) optionally at least one light-coloured inorganic filler, preferably white-coloured.
g) [and], optionally various organic or inorganic compounds such as a diluent [solvent] for dibenzoyl peroxide such as dibutyl phthalate or an inorganic filler such as cristobalite.

The third component contains:

a) at least glass beads, treated or otherwise and, optionally, various organic or inorganic compounds.

One of the essential constituents of the road paint compositions according to the present invention is an unsaturated polyester. Various unsaturated polyesters (known to a person skilled in the art) may be employed, resulting from the polycondensation of one or more polyacids (or of their anhydrides), at least one of them being unsaturated, and of one or more polyalcohols such as propylene glycol, ethylene glycol, diethylene glycol, dipropylene glycol, neopentyl glycol or glycerol.

Maleic, fumaric, citraconic, itaconic and meta-conic acids may be mentioned by way of example of unsaturated polyacids.

Ortho-, iso- or terephthalic, adipic, succinic, sebacic or tetrahydrophthalic acids may be mentioned by way of example of saturated polyacids. As indicated above, an anhydride of a polyacid, for example an anhydride of the abovementioned polyacids, may be employed instead of the polyacid, saturated or otherwise.

Polyvinyl esters are also suitable for the present invention.

The unsaturated polyesters which are suitable for the invention are generally introduced in solution in an ethylenically unsaturated monomer, which serves as diluent as well as comonomer. The quantity of unsaturated polyester solution employed in a two- or three-component paint composition is generally between 10 and 60% by weight of the first component described above, preferably from 15 to 30%. Furthermore, the unsaturated polyester solution generally includes from 40 to 70% by weight of unsaturated polyester in the ethylenically unsaturated monomer(s).

As indicated above, the road paint compositions according to the invention also contain an ethylenically unsaturated monomer which is brought in, at least partially, by the unsaturated polyester solution and, if necessary, added as complement to this composition.

The ethylenically unsaturated monomers that can be employed are styrene, vinyltoluene, chlorostyrene, divinylbenzene, vinyl acetate or a mixture of two or more of the abovementioned monomers.

Acrylic monomers and acrylic oligomers are also suitable for the invention but, to protect the environment and because of their irritant and toxic nature, the Applicant Company prefers to limit the use of these acrylic compounds. Also, the Applicant Company prefers to limit the use as diluent for the unsaturated polyester of saturated organic compounds or solvents such as ethyl, propyl or butyl acetates, toluene, acetone, methyl ethyl ketone or methyl isobutyl ketone.

The content of ethylenically unsaturated monomers introduced as complement of those present in the solution of unsaturated polyesters may vary within wide limits: it is preferably lower than or equal to 25% by weight of the first component of the composition. More preferably this content is between 10 and 15% by weight of the first component of the composition.

Another essential constituent of the road paint compositions according to the present invention is a polymerization accelerator, chosen from toluidine derivatives, preferably from para-toluidine derivatives, more preferably from diethanol-para-toluidine, diethoxy-para-toluidine, diethyl-para-toluidine or a mixture of the abovementioned para-toluidine derivatives. In a two- or three-component paint composition the polymerization accelerator is advantageously employed in a proportion of 0.02 to 1% by weight, calculated on the first component of the road paint composition. This content is preferably between 0.05 and 0.3%.

The road paint compositions according to the invention also contain a coloured pigment, preferably white-coloured. The preferred pigment is titanium dioxide (anatase or rutile). The content of coloured pigment may vary within wide limits and is a function of the type of pigment employed. When the chosen pigment is titanium dioxide, its content is generally between 5 and 25% by weight of the first component of the composition.

The compositions according to the invention also contain at least one compound capable of being exuded at the surface of the paint and of preventing the inhibition of polymerization by the oxygen in air; such a compound is preferably chosen from waxy substances which have a melting point of between 20 and 80° C., such as some paraffinic oils, paraffin waxes or waxes. Such a compound is generally employed in a proportion of 0.05 to 0.5% by weight of the first component.

The road paint compositions according to the invention may preferably contain inorganic fillers such as calcium carbonate, silica, talc, barium sulphate, alumina trihydrate, cristobalite, mica, kaolin and the like or a mixture of the abovementioned fillers. The inorganic filler content may vary within wide limits. It is preferably lower than or equal to 70% by weight of the first component of the road paint composition, as higher contents may result in a considerable decrease in the mechanical properties. More preferably this content is higher than or equal to 20% by weight of the first component of the road paint composition.

In contrast, the Applicant Company advises against the use of phthalates as plasticizing agent, because, by exuding at the surface of the paint, these compounds, when provided in a sufficient content to act as a plasticizer, result in the appearance of tack and, consequently, reduce the resistance to soiling. Nevertheless, as indicated above, phthalates may be included in the compositions according to the invention as a diluent for dibenzoyl peroxide in small quantity, generally smaller than 1% by weight of the first component.

The Applicant Company also advises against introducing into the compositions according to the invention organic solvents which are unreactive, that is to say which contain no ethylenic unsaturation, like, for example, alcohols, aromatic hydrocarbons or aliphatic esters, because of the major disadvantages which they may introduce, like delay in paint setting, softening of the film, sensitivity of the paint film to soiling and risks of pollution of the environment.

In the first component of the compositions according to the invention containing two or three components it is also possible to add conventional additives to road paints, which are:

one (or more) polymerization inhibitor(s) as complement of the polymerization inhibitor(s) which are normally provided with the unsaturated polyester resin. These inhibitors may be chosen from the following compounds: quinone ethers, para-benzoquinone, methylhydroquinone, methylethylhydroquinone, ethylhydroquinone, tert-butyl catechol, di-tert-butyl-para-cresol or a mixture of the abovementioned polymerization inhibitors. The content of added polymerization inhibitor is generally lower than 0.01% by weight of the first component of the road paint compositions;

one (or more) agent(s) stabilizing against ultraviolet (UV) rays. As example of such agents, which are well known to a person skilled in the art, there may be mentioned benzotriazoles, benzophenones, triazines and HALSs (highly sterically hindered amines, acting as a radical-scavenger). The content of this agent is generally lower than or equal to 2% by weight of the first component of the road paint;

one (or more) thickening agent(s) which may be chosen from the following compounds: polyamides, swelling clays of the bentone type, sepiolite, attapulgite and hydrogenated castor oil. The content of this agent is generally lower than or equal to 2% by weight of the first component of the road paint.

one (or more) antifoam agent(s);

one (or more) thickening agent(s);

one (or more) dispersing agent(s);

and the like.

As indicated above, the preparation of the road paint compositions according to the present invention also involves the use of glass beads, of dibenzoyl peroxide and, optionally, one (or more) compound(s) for distributing the catalyst over the surface of the glass beads. The dibenzoyl peroxide is preferably in pulverulent form. Furthermore, the dibenzoyl peroxide represents generally of the order of 1 to 5% by weight, calculated on the quantity of unsaturated polyester present in the first component before crosslinking.

The preparation of the road markings from the road paint compositions according to the invention may be performed simply, in various ways.

For the preparation of the first component of the two- or three-component compositions, the procedure is preferably as follows:

in a first step all or a part of the following products are introduced into a receptacle with stirring, in the following order: the unsaturated polyester (a) in solution in an ethylenically unsaturated monomer (b), other compounds, such as the polymerization inhibitor, the compound (e) used as oxygen barrier, heated to a temperature above its melting temperature and, if appropriate, as complement, one or more ethylenically unsaturated monomers;

next, the coloured pigment (d) is added and, if appropriate, one or several light-coloured inorganic fillers (f) and the preparation thus obtained is kept stirred until a homogeneous mixture is obtained;

lastly, the polymerization accelerator (c) is added to this homogeneous mixture and optionally so are one or more other compounds, such as a stabilizing agent and a dispersing agent, if the latter was not introduced earlier.

The preparation thus obtained is kept stirred until a homogeneous mixture is obtained, with a viscosity adjusted as a function of the means employed for the application, in order to maintain a constant application thickness at a constant flow rate.

This preparation may be applied to a roadway, wet or dry, with the aid of the usual means (brush, airless spray gun, pneumatic gun, and the like), either beforehand, just before the application of the second component, and, if appropriate, of the third component, or after mixing with the second component and, if appropriate, the third component.

In general, to prepare a two-component road paint composition according to the invention, from one to two parts by weight of the second component are mixed with one to two parts by weight of the first component.

The road paint composition according to the invention advantageously exhibits good adherence to a wet roadway and can consequently be applied in rainy weather at variable ambient temperatures which can vary from 5 to 60° C. More advantageously the curing of the paint according to the invention after application does not exceed 20 minutes and is generally shorter than or equal to 10 minutes.

Finally, the road paint composition according to the invention produces road markings which fully satisfy the main criteria required, namely:

visibility both in daytime and at night;
durability despite their low thickness (lower than or equal to 500 microns and more generally of the order of 250 microns), by virtue of their mechanical properties;
slip resistance.

In addition the road paint composition according to the invention is:

easy and rapid to process;
stable in pots in the various packagings which can be envisaged (two or three components kept separately);
economical in cost of manufacture.

The examples below illustrate the present invention.

EXAMPLE 1

A two-component road paint composition is prepared as indicated above from one part by weight of a first component including (in % by weight):

45% of a solution containing 65%±2% by weight of an unsaturated polyester in styrene, marketed under the name Sterpon BD 39-12 by Convert;
15% of a solution of 69% by weight of an unsaturated polyester in styrene, marketed under the name Norsodyne F 807 by Cray Valley;
20% of rutile titanium dioxide marketed under the name RHD2 by Tioxide;
19.6% of styrene, as complement;
0.3% of paraffin wax 50/52 (marketed by British Petroleum Chemical) heated to more than 50–52° C.;
0.1% of dimethyl-para-toluidine and from one part by weight of a second component including (in % by weight):
untreated glass beads marketed under the name MB1 by Novitec;
2.5% of dibenzoyl peroxide (calculated on the weight of the second component).

Immediately after the mixing of the first and second components the mixture obtained is applied by means of an (airless) spray gun to a wet roadway.

This road paint composition has a very satisfactory cure time of 8 minutes between its application and the reopening of the road to traffic after marking. In addition it exhibits good adherence to wet roadway; in fact, when it is subjected to the tensile peeling test according to the standard NF-T 30 062 after one week's application, a cohesive rupture of the support of the road paint is observed.

EXAMPLE 2

A two-component road paint composition is prepared as indicated above from one part by weight of a first component including (in % by weight):

26.6% of a solution containing 67% by weight of an unsaturated polyester in styrene, marketed under the name Norsodyne M003 by Cray Valley;
11.1% of styrene, as complement;
47.3% of $CaCO_3$ marketed under the name Calfort 1 by Reverte;
0.3% of paraffin wax 50/52 (marketed by British Petroleum Chemical) heated to more than 50–52° C.;
0.1% of diethanol-para-toluidine marketed under the name Plexilith 492 by Röhm;
14.6% of titanium dioxide marketed under the name RCL 388 by S.C.M.;
0.003% of polymerization inhibitor;
and from one part by weight of a second component consisting of treated glass beads marketed under the name Tecnoperl Super by Sovitec and containing dibenzoyl peroxide.

Immediately after the mixing of the first and second components the mixture obtained is applied by means of a roller to a wet roadway.

This road paint composition exhibits a very satisfactory cure time of 5 minutes between its application and the reopening of the road to traffic after marking. In addition, it exhibits good adherence to wet roadway; in fact, when it is subjected to the tensile peeling test according to the standard NF-T 30 062 after one week's application, a cohesive rupture of the support of the road paint is observed.

EXAMPLE 3

A two-component road paint composition is prepared as indicated above from one part by weight of a first component including (in % by weight):

19% of a solution containing 65%±2% by weight of an unsaturated polyester in styrene, marketed under the name Sterpon BD 39-12 by Convert;
7.5% of styrene, as complement;
53% of $CaCO_3$ marketed under the name Durcal 5 by Omya;
11. 6% of titanium dioxide marketed under the name RHD2 by Tioxide;
0.3% of paraffin wax 50/52 (marketed by British Petroleum Chemical) heated to more than 50–52° C.;
8.4% of trimethylolpropane trimethacrylate marketed under the name Norsocryl TMPTMA by Atochem;
0.003% of polymerization inhibitor;
0.1% of an anti-UV agent based on benzotriazole, marketed by Ciba Geigy under the name Tinuvin 765;
0.1% of diethoxy-para-toluidine;
and from one part by weight of a second component consisting of treated glass beads marketed under the name Tecnoperl Super by Sovitec and containing dibenzoyl peroxide.

Immediately after the mixing of the first and second components the mixture obtained is applied by means of an (airless) spray gun to a wet roadway.

This road paint composition exhibits a very satisfactory cure time of 15 minutes between its application and the reopening of the road to traffic after marking. In addition it exhibits a good adherence to wet road; in fact, when it is subjected to the tensile peeling test according to the standard NF-T 30 062 after 24 hours' application, a cohesive rupture of the support of the road paint is observed.

EXAMPLE 4 (COMPARATIVE)

A two-component road paint composition is prepared as indicated above from one part by weight of a first component including (in % by weight):

- 19% of a solution containing 65%±2% by weight of an unsaturated polyester in styrene, marketed under the name Sterpon BD 39-12 by Convert;
- 5.6% of styrene, as complement;
- 53% of $CaCO_3$ marketed under the name Durcal 5 by Omya;
- 11.6% of titanium dioxide marketed under the name RHD2 by Tioxide;
- 0.3% of paraffin wax 50/52 (marketed by British Petroleum Chemical) heated to more than 50–52° C.;
- 8.4% of trimethylolpropane trimethacrylate marketed under the name Norsocryl TMPTMA by Atochem;
- 0.003% polymerization inhibitor;
- 0.1% of an anti-UV agent based on benzotriazole, marketed by Ciba Geigy under the name Tinuvin 765;
- 2% of a solution containing 6% by weight of cobalt octoate in white spirit, and from one part by weight of a second component including (in % by weight) treated glass beads marketed under the name Tecnoperl Super by Sovitec and containing dibenzoyl peroxide.

Immediately after the mixing of the first and second components the mixture obtained is applied by means of a spray gun of an "airless" type to a wet roadway.

This road paint composition fails to polymerize and remains pasty for a long period of time, much longer than 20 minutes.

We claim:

1. Road paint compositions characterized in that they contain as essential constituents, after application:
   a) at least one unsaturated polyester;
   b) at least one ethylenically unsaturated monomer, as diluent and as comonomer for radical polymerization of the unsaturated polyester;
   c) at least one polymerization accelerator chosen from the group consisting of alkyl, alkoxy and hydroxyalkyl substituted toluidines;
   d) at least one coloured pigment;
   e) at least one compound capable of being exuded at the surface of the paint and of preventing the inhibition of polymerization by the oxygen in air;
   f) optionally at least one white-coloured inorganic filler;
   g) glass beads;
   h) dibenzoyl peroxide as catalyst for the polymerization reaction of the unsaturated polyester with the ethylenically unsaturated monomer;
   i) as well as, optionally, one or more compounds for distributing the catalyst over the surface of the glass beads.

2. Road paint compositions including two components kept separately, the two components being mixed just before the application of the paint or applied successively to the roadway, a first component containing as essential constituents:
   a) at least one unsaturated polyester;
   b) at least one ethylenically unsaturated monomer as diluent and as comonomer for radical polymerization of the unsaturated polyester;
   c) at least one polymerization accelerator chosen from the group consisting of alkyl, alkoxy and hydroxyalkyl substituted toluidines;
   d) at least one coloured pigment;
   e) at least one compound capable of being exuded at the surface of the paint and of preventing the inhibition of polymerization by the oxygen in air;
   f) optionally, at least one white-coloured inorganic filler;
   and a second component containing, as essential constituents:
   g) glass beads;
   h) dibenzoyl peroxide as catalyst for the polymerization reaction of the unsaturated polyester with the ethylenically unsaturated monomer; and
   i) optionally one or more compounds for distributing the catalyst over the surface of the glass beads;
   j) optionally at least one inorganic filler.

3. Road paint compositions including three components kept separately, optionally the three components being mixed just before the application of the paint or applied successively to the roadway, the first component containing as essential constituents:
   a) at least one unsaturated polyester;
   b) at least one ethylenically unsaturated monomer, as diluent and as comonomer for radical polymerization of the unsaturated polyester;
   c) at least one polymerization accelerator chosen from the group consisting of alkyl, alkoxy and hydroxyalkyl substituted toluidines;
   d) at least one coloured pigment;
   e) at least one compound capable of being exuded at the surface of the paint and of preventing the inhibition of polymerization by the oxygen in air;
   f) optionally at least one white-coloured inorganic filler;
   the second component containing:
   g) glass beads, treated or untreated;
   and the third component containing:
   h) dibenzoyl peroxide as catalyst for the polymerization reaction of the unsaturated polyester with the ethylenically unsaturated monomer; and
   i) optionally a diluent for dibenzoyl peroxide; and
   j) optionally an inorganic filler.

4. Road paint compositions including three components kept separately, optionally the three components being mixed just before the application of the paint or applied successively to the roadway, the first component containing as essential constituents:
   a) at least one unsaturated polyester;
   b) at least one ethylenically unsaturated monomer, as diluent and as comonomer for radical polymerization of the unsaturated polyester;
   c) at least one polymerization accelerator chosen from the group consisting of alkyl, alkoxy and hydroxyalkyl substituted toluidines;
   d) at least one coloured pigment;
   e) at least one compound capable of being exuded at the surface of the paint and of preventing the inhibition of polymerization by the oxygen in air;

f) optionally at least one white-coloured inorganic filler;
the second component containing:
  a) at least one unsaturated polyester;
  b) at least one ethylenically unsaturated monomer, as diluent and as comonomer for radical polymerization of the unsaturated polyester;
  c) dibenzoyl peroxide as catalyst for the polymerization reaction of the unsaturated polyester with the ethylenically unsaturated monomer;
  d) at least one coloured pigment;
  e) at least one compound capable of being exuded at the surface of the paint and of preventing the inhibition of polymerization by the oxygen in air;
  f) optionally at least one white-coloured inorganic filler;
  g) optionally a diluent for dibenzoyl peroxide;
  h) optionally another inorganic filler;
and the third component containing;
  a) glass beads, treated or untreated.

5. Compositions according to claim 1, characterized in that the polymerization accelerator is chosen from the group consisting of para-toluidine derivatives.

6. Compositions according to claim 1, characterized in that the polymerization accelerator is employed in a proportion of 0.02 to 1% by weight calculated on the total weight of a)–f) of the road paint composition.

7. Compositions according to claim 6, characterized in that the polymerization accelerator is employed in a proportion of 0.05 to 0.3% by weight.

8. Compositions according to claim 2, characterized in that the quantity of unsaturated polyester employed for preparing the first component of the road paint composition the is between 10 and 60% by weight of this first component.

9. Compositions according to claim 1, characterized in that the ethylenically unsaturated monomer is styrene, vinyltoluene, chlorostyrene, divinylbenzene, vinyl acetate or a mixture of two or more of the said monomers.

10. Compositions according to claim 2, characterized in that the content of ethylenically unsaturated monomers introduced as a complement of those present with the unsaturated polyester is lower than or equal to 25% by weight of the first component.

11. Compositions according to claim 10, characterized in that said content is between 10 and 15% by weight of the first component.

12. Compositions according to claim 1, characterized in that the pigment is titanium dioxide.

13. Compositions according to claim 2, characterized in that the pigment is titanium oxide, and the titanium dioxide content is between 5 and 25% by weight of the first component.

14. Compositions according to claim 2, characterized in that the inorganic filler content is lower than or equal to 70% by weight of the first component.

15. Compositions according to claim 14, characterized in that said content is higher than or equal to 20% by weight of the first component.

16. Compositions according to claim 1, characterized in that the compound capable of being exuded at the surface of the paint and of preventing the inhibition of polymerization by the oxygen in air is chosen from the group consisting of waxy substances which have a melting point of between 20 and 80° C.

17. Compositions according to claim 6, characterized in that said compound capable of being exuded is employed in a proportion of 0.05 to 0.5% by weight of the total weight of a)–f).

18. Compositions according to claim 1, characterized in that dibenzoyl peroxide is present in a concentration of about 1 to 5% by weight, calculated on the quantity of unsaturated polyester present before crosslinking.

19. Compositions according to claim 8, wherein said quantity of unsaturated polyester is from 15 to 30% by weight of the first component.

20. Road paint compositions according to claim 1, wherein the coloured pigment is a white pigment.

21. Road paint compositions according to claim 2, wherein the coloured pigment is a white pigment.

22. Road paint compositions according to claim 3, wherein the coloured pigment is a white pigment.

23. Road paint compositions according to claim 4, wherein the coloured pigment of the first component is a white pigment.

24. Road paint compositions according to claim 4, wherein the coloured pigment of the second component is a white pigment.

25. Road paint compositions characterized in that they contain as essential constituents, after application:
  a) at least one unsaturated polyester;
  b) at least one ethylenically unsaturated monomer, as diluent and as comonomer for radical polymerization of the unsaturated polyester;
  c) at least one polymerization accelerator that is diethanol-para-toluidine, diethoxy-para-toluidene, diethyl-para-toluidene, dimethyl-para-toluidene or a mixture thereof;
  d) at least one coloured pigment;
  e) at least one compound capable of being exuded at the surface of the paint and of preventing the inhibition of polymerization by the oxygen in air;
  f) optionally at least one white-coloured inorganic filler;
  g) glass beads;
  h) dibenzoyl peroxide as catalyst for the polymerization reaction of the unsaturated polyester with the ethylenically unsaturated monomer;
  i) as well as, optionally, one or more compounds for distributing the catalyst over the surface of the glass beads.

26. Road paint compositions according to claim 1, wherein the polymerization accelerator is capable of accelerating polymerization in wet conditions.

* * * * *